(12) United States Patent
Gerster et al.

(10) Patent No.: US 9,671,275 B2
(45) Date of Patent: Jun. 6, 2017

(54) MINIBAR SCALE TO WEIGH A MINIBAR

(71) Applicants: Soehnle Industrial Solutions GmbH, Backnang (DE); Dometic Dienstleistungs-GmbH, Siegen (DE)

(72) Inventors: Stephan Gerster, Wachtberg-Pech (DE); Steffen Gross, Netphen (DE); Michael Althaus, Freudenberg (DE)

(73) Assignees: SOEHNLE INDUSTRIAL SOLUTIONS GMBH, Backnang (DE); DOMETIC DIENSTLEISTUNGS-GMBH, Siegen (DE)

( * ) Notice: Subject to any disclaimer, the term of this patent is extended or adjusted under 35 U.S.C. 154(b) by 108 days.

(21) Appl. No.: 14/331,246

(22) Filed: Jul. 15, 2014

(65) Prior Publication Data

US 2015/0021104 A1 Jan. 22, 2015

(30) Foreign Application Priority Data

Jul. 17, 2013 (DE) .......... 10 2013 214 070

(51) Int. Cl.
*G01G 19/52* (2006.01)
*G01G 19/40* (2006.01)
*G01G 19/42* (2006.01)

(52) U.S. Cl.
CPC ............ *G01G 19/52* (2013.01); *G01G 19/40* (2013.01); *G01G 19/42* (2013.01); *Y10T 29/49716* (2015.01); *Y10T 29/49826* (2015.01)

(58) Field of Classification Search
CPC ........ G01G 19/40; G01G 19/42; G01G 19/52; G01G 21/22
See application file for complete search history.

(56) References Cited

U.S. PATENT DOCUMENTS

| | | | | | |
|---|---|---|---|---|---|
| 3,863,724 | A | * | 2/1975 | Dalia, Jr. ............... | G01G 3/142 177/1 |
| 4,419,734 | A | * | 12/1983 | Wolfson ............... | B65G 1/1371 177/25.13 |
| 4,891,755 | A | * | 1/1990 | Asher .................. | G01G 19/414 177/210 R |
| 4,961,533 | A | * | 10/1990 | Teller ....................... | B67D 1/06 177/25.19 |
| 4,966,241 | A | * | 10/1990 | Luchinger .............. | G01G 21/22 177/253 |
| 5,434,367 | A | * | 7/1995 | Salini ..................... | G01G 21/10 177/189 |
| 6,107,928 | A | * | 8/2000 | Gatti ....................... | A47B 69/00 340/568.1 |
| 6,349,244 | B1 | * | 2/2002 | Bardin .................... | G07F 11/42 221/108 |

(Continued)

FOREIGN PATENT DOCUMENTS

GB 2204417 A 11/1988

*Primary Examiner* — Natalie Huls
(74) *Attorney, Agent, or Firm* — Leydig, Voit & Mayer, Ltd.

(57) ABSTRACT

A minibar weighing machine for weighing a minibar refrigerator includes a receiving portion for receiving an underside of a minibar which is directed towards the minibar weighing machine where at least part of the minibar weighing machine and at least part of the minibar are arranged in a common, horizontal plane when the minibar is positioned in a weighing position.

10 Claims, 1 Drawing Sheet

(56) References Cited

U.S. PATENT DOCUMENTS

| | | | |
|---|---|---|---|
| 2007/0119195 A1* | 5/2007 | Meredith | F25C 5/187 62/137 |
| 2007/0255182 A1* | 11/2007 | Werner | F17C 13/023 600/584 |
| 2008/0103939 A1* | 5/2008 | Gibb | G07F 11/002 705/28 |
| 2010/0282840 A1* | 11/2010 | Henry | G06Q 10/087 235/382 |
| 2015/0014068 A1* | 1/2015 | Volker | B01D 61/04 177/45 |
| 2015/0153217 A1* | 6/2015 | Dillon | G07F 9/105 177/1 |

* cited by examiner

MINIBAR SCALE TO WEIGH A MINIBAR

CROSS REFERENCE TO RELATED APPLICATIONS

This application claims priority from German Patent Application No. DE 10 2013 214 070.3, filed Jul. 17, 2013, which is hereby incorporated by reference here in its entirety.

FIELD

The invention relates to a minibar weighing machine for weighing a minibar, more particularly a minibar refrigerator.

The invention further relates to a method for retrofitting a minibar located in a cupboard.

Moreover, the invention relates to a method for filling a minibar with a plurality of products of different types.

BACKGROUND

Minibars, more particularly minibar refrigerators, are used for refrigerating beverages and/or food and are generally smaller than commercial domestic refrigerators so that they require less installation space. This makes minibars ideal for use in hotel rooms, where there is little space available, yet the guest should nevertheless be provided with as much comfort as possible. For aesthetic reasons, and due to the limited space available, minibars are generally arranged in a hotel room cupboard.

Prior to the arrival of the guest, the minibar is prefilled with beverages which are available for the guest's consumption during his stay at the hotel. When the guest checks out of the hotel, he must state whether he consumed anything, and if so, what. Experience shows that many guests conceal the consumption of beverages, which results in a financial loss for the hotel.

GB 2 204 417 A describes a minibar weighing machine for weighing a minibar, which is connected to a hotel computer via a data line. The weight values determined by the minibar weighing machine are transmitted to the hotel computer via the data line. The hotel can check the weight of the minibar when the guest checks out and draw conclusions therefrom as to whether or not the guest has consumed products from the minibar.

With the previously described minibar weighing machine, it is disadvantageous that it has a large design. As a result thereof, retrofitting minibars with the minibar weighing machine is difficult, since there is only a small amount of space available in the cupboard housing the minibar to receive additional components, such as the minibar weighing machine. A further disadvantage of the minibar weighing machine is that it cannot be used to establish whether the guest has replaced products located in the minibar with other products of a lower price or lower value.

SUMMARY OF THE INVENTION

In an embodiment, the present invention provides a minibar weighing machine for weighing a minibar refrigerator including a receiving portion for receiving an underside of a minibar where at least part of the minibar weighing machine and at least part of the minibar are disposed in a common, horizontal plane when the minibar is disposed in a weighing position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
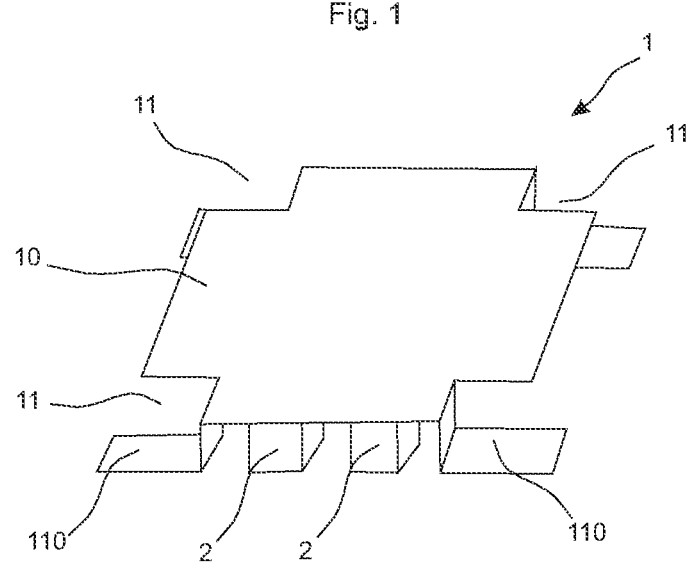
FIG. 1 is a schematic view of a receiving portion of the minibar weighing machine according to the invention.

An aspect of the present invention provides a minibar weighing machine which is configured such that it can be installed together with the minibar in the cupboard housing the minibar, meaning that existing minibars can be retrofitted with the minibar weighing machine.

In an embodiment, the present invention provides a minibar weighing machine, which is characterised in that the minibar can be positioned in a weighing position in order to carry out a weighing operation. In the weighing position, at least part of the minibar and at least part of the minibar weighing machine, more particularly a minibar protrusion, are arranged in a common, horizontal plane.

This configuration of the minibar weighing machine ensures that the minibar weighing machine together with the minibar only takes up slightly more space than the minibar on its own. This means that when installed in for example a cupboard, the minibar together with the minibar weighing machine requires only a small amount of space, and retrofitting existing minibars with the minibar weighing machine is therefore readily possible even if there is only a small amount of space available in a narrow cupboard.

Within the meaning of the invention, the arrangement of at least part of the minibar weighing machine and at least part of the minibar in a common plane is to be understood to mean that at least part of the minibar and at least part of the minibar weighing machine are located in a common plane at the same time at the minibar is positioned in the weighing position. In comparison with a configuration in which the minibar merely stands on a planar weighing surface of a weighing machine (i.e. there is no horizontal plane in which part of the minibar and part of the minibar weighing machine are arranged at the same time), the arrangement according to the invention takes up substantially less space.

Another aspect of the present invention provides a method for retrofitting a minibar located in a cupboard.

In an embodiment, the present invention provides a method of the type mentioned at the outset, which is characterised in that a minibar weighing machine is positioned in the cupboard such that the minibar is arranged in the weighing position. The minibar weighing machine comprises a receiving portion which is configured such that in the weighing position of the minibar, part of the minibar and part of the minibar weighing machine are arranged in a common, horizontal plane.

Yet another aspect of the present invention provides a method by means of which it can be detected whether the products located in the minibar also correspond to the products with which the minibar was originally filled.

In an embodiment, the present invention provides a method of the type mentioned at the outset, which is characterised in that a product of one type is selected in terms of its weight such that it cannot be substituted by a product of another type or by a plurality of products of other types. The products may be for example bottled or canned beverages and/or food of the type conventionally contained in minibars, more particularly minibar refrigerators, of hotels.

Selecting a type of product having a weight which means that it cannot be substituted by other types of product offers the advantage that the removal of a product can always be established for example by the hotel reception when the guest checks out of the hotel. This is possible because the removed product has a weight which cannot be substituted by a product of another type. This means for example that a hotel guest cannot conceal having consumed a product from the minibar by putting another product in the minibar.

The weight of the product can be made non-substitutable by selecting the weight of a product of a first type such that no other product has the same weight. In addition, it can advantageously be provided that the weight of a product of one type is selected such that the sum of the weights of a plurality of products of one or more other types does not result in the weight of the product of the first type. For example, in this way it is not possible to deceive the system from which a champagne bottle has previously been taken by inserting two cola bottles in its place.

In particular, it can advantageously be provided that the change in weight of the minibar over time is monitored and recorded. As a result, in particular a situation can also be taken into account where a hotel guest has temporarily placed his own product in the minibar, such as medicines to be refrigerated or food or beverages that he has brought with him. In this case, it can be provided in particular that a check is carried out—preferably automatically by means of a PC—as to whether the weight of the minibar is plausible. In this case it is advantageous that the system knows the weights of the products of each type and the initial fill state and can draw conclusions on the basis of this knowledge as to which products have actually been removed from the minibar.

Alternatively or additionally, the weight value of the product may be so high that it could only be substituted by a plurality of other products, yet there is insufficient space in the minibar to receive the plurality of other products.

The removal of a product would only be unapparent from the current weight value of the minibar if the minibar were refilled with the removed product or a product of the same type. In both cases, the determined actual weight value corresponds to a desired weight value. The desired weight value corresponds to the actual weight value of the minibar when it is filled for example by a hotel employee before a guest checks into the hotel room. However, on the basis of changes in weight of the minibar, it could be established that a product has been temporarily removed and put back again.

In a particular configuration, the minibar weighing machine can comprise a receiving portion, more particularly a receiving plate. The receiving portion can be used to receive an underside of the minibar directed towards the minibar weighing machine and can be complementary in shape to the underside of the minibar. A shape-complementing configuration of the receiving portion offers the advantage that the entire underside directed towards the minibar weighing machine rests directly on the minibar weighing machine. The storage space required by the minibar weighing machine and minibar therefore advantageously increases only marginally when a pre-existing minibar is retrofitted with a minibar weighing machine of this type.

The receiving portion can be made to form an elbow in a corner region in order to receive the minibar, more particularly a minibar protrusion. Alternatively or additionally, the receiving portion can have a recess in the corner region for receiving a minibar protrusion, for example a foot of the minibar. When carrying out the weighing operation, the minibar protrusion engages in the elbow and/or recess. This ensures that as little as possible, ultimately space-wasting, intermediate space is formed between the receiving portion and the underside directed towards the minibar weighing machine when the minibar is placed onto the minibar weighing machine for carrying out the weighing operation. As a result, it is ensured that the size of the arrangement of the minibar and of the minibar weighing machine is only slightly increased. The minibar and minibar weighing machine can be components which are produced separately from each other and are interconnected in order to carry out the weighing operation.

The minibar weighing machine can comprise a base plate which is connected to the receiving portion. The base plate and receiving portion can be components which are produced separately from each other. Weighing cells can be arranged between the base plate and the receiving portion. The connection between the receiving portion and the base plate can be configured to be detachable. This offers the advantage that it is simple to repair or exchange for example defective weighing cells. The base plate can be recessed in the corner regions of the receiving portion so that the base plate does not obstruct an elbowed or recess floor of the receiving portion. The minibar weighing machine can have a substantially plate-shaped configuration.

The receiving portion and/or base plate may each be integrally formed and/or may each consist of stainless steel. More particularly, the receiving portion and/or base plate can each be a sheet metal moulded part. Providing an integrally formed receiving portion and/or base plate offers the advantage that the minibar weighing machine can be produced without a large number of work steps. Forming the receiving portion as a sheet metal moulded part offers the advantage that said part can be machined substantially by a non-cutting shaping process, thereby simplifying production of the receiving portion. Moreover, a configuration of this type is very robust and less susceptible to faults.

The minibar weighing machine can comprise a communication means for transmitting and/or receiving data. The data can be transmitted as a signal or as a data set either directly or indirectly, more particularly in a network for example a hotel. The communication means can comprise a data line, via which the data are transmitted. Alternatively or additionally, the data transfer can take place wirelessly, for example via WLAN, Bluetooth or the like. The weight values determined by the minibar weighing machine can be transmitted via the communication means to a receiver, such as a computer. When using the minibar in a hotel, the communication means can be configured such that it can communicate with hotel software.

Furthermore, the minibar weighing machine can comprise a comparison unit. The comparison unit is used to determine whether a product has been removed from the minibar weighing machine. For this purpose, the comparison unit can compare the determined actual weight value of the minibar weighing machine with a desired weight value which is recorded for example in a memory unit. If the actual weight value differs from the desired weight value, the comparison unit can output a message that a product has been removed from the minibar. The message can be transmitted via the communication means to the receiver, such as a computer at a hotel reception, and can contain for example information relating to the removed product and the price thereof. Of course, as already mentioned, the comparison unit can also determine whether for example a hotel guest has deposited his own product in the minibar. When the guest checks out of the hotel, the guest can be informed that he has left a product in the minibar.

Figure 2:
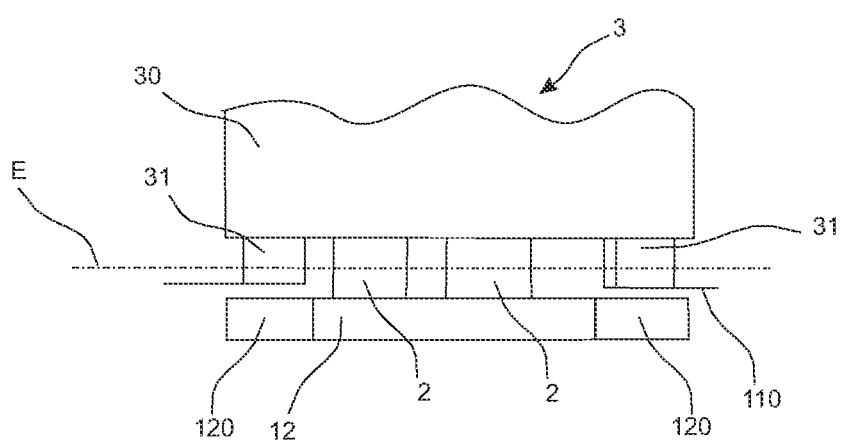
FIG. 2 is a schematic view of a minibar weighing machine according to the invention with the minibar.

A minibar weighing machine 1 for weighing a minibar 3 shown in FIG. 2 comprises an integrally formed receiving portion 10. The receiving portion 10 is substantially plate-shaped and has an elbow 11 in each of the corner regions. The elbow 11 is used to receive a minibar protrusion 31 shown in FIG. 2 and comprises an elbow floor 110.

The minibar weighing machine 1 further comprises a base plate 12 which is shown in FIG. 2 and is more particularly integrally formed. The base plate 12 is detachably connected to the receiving portion 10 and has recesses 120 in the corner regions 11 of the receiving portion 10. Weighing cells 2 are arranged between the receiving portion 10 and the base plate.

The minibar 3 comprises a minibar main body 30 and minibar protrusions 31 extending therefrom. When the minibar 3 is placed onto the minibar machine 1, an underside pointing from a minibar main body 30 towards the receiving portion 12 rests directly on the receiving portion 12. The minibar protrusions 31 rest directly on the elbow floor 110 when the minibar 3 is placed onto the receiving portion 10. The elbow is formed such that the elbow floor 110 is arranged above the base plate 12.

When a weighing operation is carried out, and thus the minibar 3 is arranged on the minibar weighing machine 1, part of the minibar protrusions 31 and part of the minibar weighing machine 1 are arranged in a common, horizontal plane E.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 minibar weighing machine
2 weighing cell
10 receiving portion
11 elbow
12 base plate
110 elbow floor
3 minibar
30 minibar main body
31 minibar protrusion
E plane

The invention claimed is:

1. A minibar weighing machine for weighing a minibar, the minibar weighing machine comprising:
    a receiving portion configured to receive an underside of the minibar, wherein the receiving portion includes a corner region having an elbow or a recess configured to receive a protrusion of the minibar therein, and
    wherein at least part of the minibar weighing machine and at least part of the minibar are disposed in a common, horizontal plane when the minibar is disposed in a weighing position on the minibar weighing machine.

2. The minibar weighing machine recited in claim 1 wherein the receiving portion is integrally formed.

3. The minibar weighing machine as recited in claim 1, wherein the receiving portion is a sheet metal molded part.

4. The minibar weighing machine as recited in claim 3, wherein the receiving portion is a stainless steel sheet moulded part.

5. The minibar weighing machine recited in claim 1, further comprising a communication device for at least one of transmitting or receiving data.

6. The minibar weighing machine recited in claim 1, further comprising a base plate which is connected to the receiving portion, wherein weighing cells are arranged between the receiving portion and the base plate.

7. A cupboard, comprising a minibar and a minibar weighing machine as recited in claim 1.

8. The minibar weighing machine as recited in claim 1, wherein the receiving portion for receiving the underside of the minibar is configured to be complementary in shape to the underside of the minibar.

9. The minibar weighing machine as recited in claim 1, wherein at least part of the minibar weighing machine and a minibar protrusion are arranged in a common, horizontal plane when the minibar is positioned in the weighing position.

10. The minibar weighing machine as recited in claim 1, wherein the minibar is a minibar refrigerator.

\* \* \* \* \*